United States Patent
Wang et al.

(10) Patent No.: US 11,102,004 B2
(45) Date of Patent: Aug. 24, 2021

(54) SYSTEMS AND METHODS FOR DISTRIBUTED VERIFICATION OF ONLINE IDENTITY

(71) Applicant: Google LLC, Mountain View, CA (US)

(72) Inventors: Zhong Wang, Mountain View, CA (US); Gang Wang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 218 days.

(21) Appl. No.: 16/553,599

(22) Filed: Aug. 28, 2019

(65) Prior Publication Data

US 2020/0344058 A1     Oct. 29, 2020

Related U.S. Application Data

(60) Provisional application No. 62/840,204, filed on Apr. 29, 2019.

(51) Int. Cl.
    *H04L 29/06*             (2006.01)
    *H04L 9/32*              (2006.01)
    (Continued)

(52) U.S. Cl.
    CPC ............ *H04L 9/3213* (2013.01); *H04L 9/083* (2013.01); *H04L 9/3247* (2013.01);
    (Continued)

(58) Field of Classification Search
    CPC ..... H04L 9/3213; H04L 9/083; H04L 9/3247; H04L 9/3297; H04L 63/0807;
    (Continued)

(56) References Cited

U.S. PATENT DOCUMENTS

| | | | | |
|---|---|---|---|---|
| 9,456,297 | B2 * | 9/2016 | Pi-Sunyer | H04M 1/72415 |
| 2002/0162003 | A1 * | 10/2002 | Ahmed | H04L 63/0853 |
| | | | | 713/176 |

(Continued)

FOREIGN PATENT DOCUMENTS

| | | |
|---|---|---|
| EP | 3 188 104 A1 | 7/2017 |
| WO | WO-2018/153353 A1 | 8/2018 |

OTHER PUBLICATIONS

Office Action for KR Appln. Ser. No. 10-2020-7026660 dated Nov. 12, 2020 (8 pages).

(Continued)

*Primary Examiner* — Sher A Khan
(74) *Attorney, Agent, or Firm* — Foley & Lardner LLP

(57) ABSTRACT

At least one aspect is directed to improving the performance of real-time verification of online identity. The issuer computing system can receive a request to generate a composite token, the composite token configured to authorize certain verifying parties to authenticate a first-party token comprising information about a client. The issuer can generate a composite token using cryptographic keys and distribute it to the client, who can distribute it to other content item networks. The verifying parties can receive the composite token from the content item networks, use a cryptographic key verify the authenticity of the token corresponding to the client device, and use the token to further process content item operations. The system can distribute the cryptographic keys prior to the generation and verification of the composite token, and as such allow the parties to verify the composite token in real-time without contacting outside verification parties.

15 Claims, 6 Drawing Sheets

(51) Int. Cl.
*H04L 9/08* (2006.01)
*H04L 29/08* (2006.01)

(52) U.S. Cl.
CPC ............ *H04L 9/3297* (2013.01); *H04L 67/20* (2013.01); *H04L 2463/102* (2013.01); *H04L 2463/121* (2013.01)

(58) Field of Classification Search
CPC ............ H04L 63/0421; H04L 63/0823; H04L 63/0876; H04W 12/02
See application file for complete search history.

(56) References Cited

U.S. PATENT DOCUMENTS

| | | | | |
|---|---|---|---|---|
| 2006/0191997 | A1* | 8/2006 | Toohey | G07F 7/122 235/379 |
| 2013/0047215 | A1* | 2/2013 | Radhakrishnan | H04L 63/0807 726/4 |
| 2015/0059003 | A1* | 2/2015 | Bouse | H04L 63/102 726/28 |
| 2016/0021093 | A1* | 1/2016 | Vinckier | G07C 9/22 726/9 |
| 2016/0094530 | A1* | 3/2016 | Mihaylov | H04L 63/10 726/7 |
| 2019/0051166 | A1* | 2/2019 | Bronk | G08G 1/0116 |
| 2019/0068588 | A1* | 2/2019 | Inabe | H04L 63/108 |

OTHER PUBLICATIONS

Office Action for KR Appln. Ser. No. 10-2020-7026660 dated Feb. 26, 2021 (6 pages).
International Search Report and Written Opinion for PCT Appln. Ser. No. PCT/US2020/028353 dated Jul. 21, 2020 (14 pages).
First Office Action for CN Appln. Ser. No. 202080002153.3 dated Jun. 1, 2021 (14 pages).
Reasons for Rejection for JP Appln. Ser. No. 2020-552038 dated Jun. 14, 2021 (7 pages).

* cited by examiner

SYSTEMS AND METHODS FOR DISTRIBUTED VERIFICATION OF ONLINE IDENTITY

CROSS-REFERENCE TO RELATED APPLICATIONS

This application claims priority to U.S. provisional patent application Ser. No. 62/840,204 filed on Apr. 29, 2019, the contents of which are incorporated herein by reference.

BACKGROUND

In a computer networked environment such as the internet, users may interact with third-party content items. These third-party content items, for example, advertisements, can be displayed on a web page associated with a respective publisher. These user can provide information to a publisher indicating interaction with a third-party content item.

SUMMARY

One technical issue addressed by the present disclosure is the difficulty in determining the identity of online users while preserving the privacy of the online users. Additionally, third-party content item distributors may want to verify the identity of a user visiting the web page of a publisher within a short, predetermined time frame (e.g., 100 milliseconds). However, accurately verifying the identity of a user would require many queries to outside sources responsible for verifying the identity of a user. This imposes unacceptable latency for certain third-party content item distributor platforms.

The challenges addressed in the present disclosure relate to providing a system capable of distributed verification of identity of online users while minimizing the number of queries to third party verifiers, while maintaining the privacy of the users to only trusted third-party content item distributors. A public key is issued to only the trusted third-party content item distributors, who are able to decrypt token data that is digitally-signed by a trusted issuer to verify the token data of a user in real-time. This minimizes the number of queries the verifying parties must make to verify the token data, which reduces network overhead and verification time.

Cookie based identity support does not support authentication by an issuer, nor does it prevent copying browser sessions, also called a "replay attack." As a result, a browser cookie is a label rather than a trustworthy identity of an online user. Similarly, on devices such as connected televisions, a device identifier provides only a weak layer of protection. No other parties can verify device authenticity on behalf of the OEM. Replay attacks, where a copy of a browser session is made to create fraudulent content item requests, cannot be detected in these cases, nor can verification of identity take place in real-time as required by many third-parties. Thus, the technical solution disclosed herein is a marked improvement over existing technologies of identity verification and fraud detection.

The present disclosure discusses a system comprising an issuer, who knows the legitimate identity of an online user, that is responsible for authenticating and generating a digital signature that corresponds to token data associated with a particular user. Through encryption, the issuer can control which third-party content distributor platforms (third-party verifiers) are able to process the user's token data. The system further comprises verifying parties who are authorized by the issuer to verify the token information associated with a particular user. Because the verification keys are maintained locally by the verifying parties, the verification process can take place in real-time and without further access to outside parties. This allows for real-time identity verification that is distributed between an issuer and third-party content item distribution platforms.

At least one aspect is directed to a method for providing a signed identity token. The method comprises generating, by a party, a first-party token associated with a domain of an issuer. The method also comprises transmitting, by the party and to the issuer, the first-party token associated with the domain of the issuer. The method further comprises receiving, by the issuer, the first-party token associated with the domain of the issuer and creating a time stamp to correspond to the first party token. The method also comprises encrypting, by the issuer, the first-party token and a time stamp using a private key of the issuer to create a digitally-signed token. The method further comprises creating, by the issuer, a plurality of digitally-signed tokens, each of the plurality of digitally-signed tokens corresponding to a respective verifying party. The method further comprises encrypting each of the plurality of digitally-signed tokens using a public key provided by the respective verifying party. The method also comprises generating, by the issuer, a composite token comprising each of the plurality of encrypted digitally-signed tokens. The method further comprises providing, by the issuer, the composite token to the party responsible for generating the first-party token.

Another aspect of the present disclosure is directed to a method for verifying the identity of a user. The method comprises receiving, by a verifying party, a composite token and a time stamp, wherein the composite token comprises a plurality of encrypted digitally-signed tokens. The method further comprises enumerating, by the verifying party, each of the plurality of encrypted digitally signed tokens in the composite token. The method also comprises determining, by the verifying party, which of the enumerated encrypted digitally signed tokens corresponds to the verifying party. The method further comprises decoding, by the verifying party, the contents of the encrypted signed token corresponding to the verifying party using a private key belonging to the verifying party to generate a signed token. The method further comprises verifying, by the verifying party using a public key corresponding to an issuer, the validity of the digital signature of the signed token to generate a valid first-party token. The method further comprises processing, by the verifying party, respondent to the digital signature of the signed token being valid, the valid first-party token generated from the signed token.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of managing fraud resistant content item operations. The various concepts introduced above and discussed in greater detail below may be implemented in any of numerous ways, as the described concepts are not limited to any particular manner of implementation.

Figure 1:
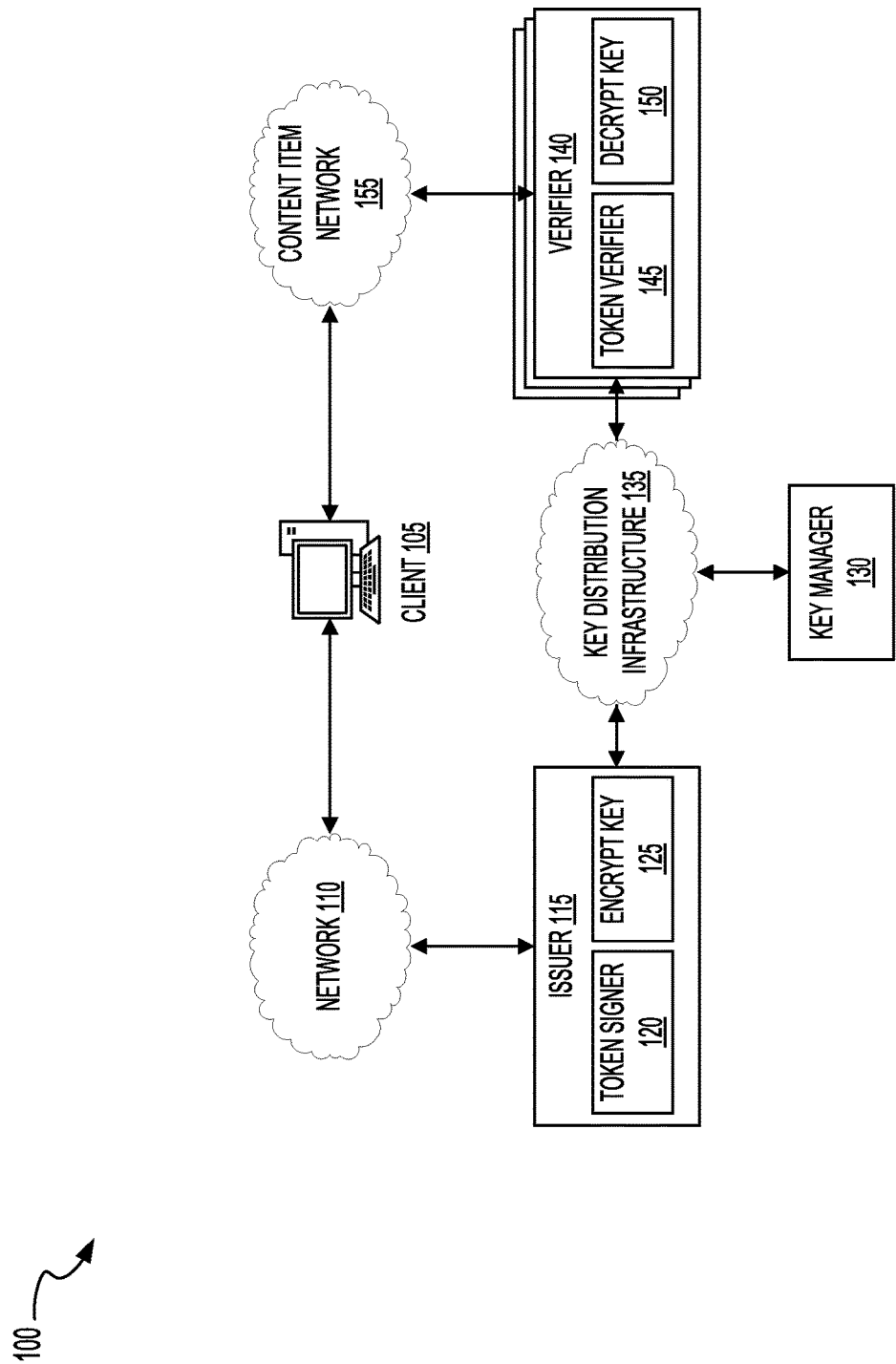
FIG. 1 is a block diagram depicting an example implementation of an environment for distributed real-time verification of online identity.

FIG. 1 is a block diagram depicting one implementation of an environment 100 for distributed real-time verification of online identity. The environment 100 includes at least one client computing system 105. The client computing system 105 can include at least one processor (or a processing circuit) and a memory. The memory stores processor-executable instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The client computing system 105 can include one or more computing devices or servers that can perform various functions.

In some implementations, the client computing system 105 can include applications such as a web browser configured to generate browser tokens. In such embodiments, the generated browser token may be associated with the domain of an issuer computer system 115, and contain information about the web browser executed by the client computing system 105. In some implementations, the client computing system 105 is configured to generate device tokens. In such embodiments, the generated device token may be associated with the domain of the issuer computing system 115, and may contain device information about the client computing system 105. The client computing system 105 may be configured to transmit the generated tokens to the issuer computing system 115 via the network 110. In some implementations, the client computing system 105 is configured to communicate with an advertising auction system via the content item network 155.

The network 110 can include computer networks such as the internet, local, wide, metro or other area networks, intranets, satellite networks, other computer networks such as voice or data mobile phone communication networks, and combinations thereof. In some implementations, any of the key distribution infrastructure 135 or the content item network 155 may be the same as, or a part of, network 110. The client computing system 105 of the environment 100 can communicate via the network 110, for instance with at least one issuer computing system 115. The network 110 may be any form of computer network that relays information between the client computing system 105 and the issuer computing system 115, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 110 can also include any number of computing devices (e.g., computer, servers, routers, network switches, etc.) that are configured to receive and/or transmit data within network 110. The network 110 can further include any number of hardwired and/or wireless connections. For example, the client computing system 105 can communicate wirelessly (e.g., via WiFi, cellular, radio, etc.) with a transceiver that is hardwired (e.g., via a fiber optic cable, a CAT5 cable, etc.) to other computing devices in network 110.

The content item network 155 can include computer networks such as the internet, local, wide, metro or other area networks, intranets, satellite networks, other computer networks such as voice or data mobile phone communication networks, and combinations thereof. In some implementations, the content item network 155 may be the same as, or a part of, network 110. The client computing system 105 of the environment 100 can communicate via the content item network 155, for instance with at least one verifier computing system 140. The content item network 155 may be any form of computer network that relays information between the client computing system 105 and at least one verifier computing system 140, and one or more content sources, for example, web servers, advertising servers, amongst others. For example, the content item network 155 may include the Internet and/or other types of data networks, such as a local area network (LAN), a wide area network (WAN), a cellular network, satellite network, or other types of data networks. The content item network 155 can also include any number of computing devices (e.g., computer, servers, routers, network switches, etc.) that are configured to receive and/or transmit data within the content item network 155. The content item network 155 can further include any number of hardwired and/or wireless connections. For example, the verifier computing system 140 can communicate wirelessly (e.g., via WiFi, cellular, radio, etc.) with a transceiver that is hardwired (e.g., via a fiber optic cable, a CAT5 cable, etc.) to other computing devices in content item network 155.

The key distribution infrastructure network 135 can include computer networks such as the internet, local, wide, metro or other area networks, intranets, satellite networks, other computer networks such as voice or data mobile phone communication networks, and combinations thereof. In some implementations, the key distribution infrastructure 135 may be the same as, or a part of, network 110. The key manager computing system 130 of the environment 100 can communicate via the key distribution infrastructure network 135, for instance with at least one issuer computing system 115 and/or at least one verifier computing system 140. The key distribution infrastructure network 135 may be any form of computer network that relays information between the key manager computing system 130 and at least one verifier computing system 140 or at least one issuer computer system 115, and one or more content sources, for example, web servers, advertising servers, amongst others. For example, the key distribution infrastructure network 135 may include the Internet and/or other types of data networks, such as a local area network (LAN), a wide area network (WAN), a cellular network, satellite network, or other types of data networks. The key distribution infrastructure network 135 can also include any number of computing devices (e.g., computer, servers, routers, network switches, etc.) that are configured to receive and/or transmit data within the key distribution infrastructure network 135. The key distribution infrastructure network 135 can further include any number of hardwired and/or wireless connections. For example, the key manager computing system 130 can communicate wirelessly (e.g., via WiFi, cellular, radio, etc.) with a transceiver that is hardwired (e.g., via a fiber optic cable, a CAT5 cable, etc.) to other computing devices in key distribution infrastructure network 135.

The issuer computing system 115 can include servers or other computing devices operated by an issuer entity to authenticate and/or digitally sign token information such as a browser or device token received from a client computing system 105. The issuer computing devices 115 can include a token signer component 120 and one or more encryption key components 125. In some implementations, the issuer computing system 115 can provide third-party content items or creatives (e.g., ads) for display on information resources, such as a website or web page that includes primary content. The issuer computing system 115 can also provide information resources such as a web page that includes primary content. The issuer computing system 115 can include instructions or computational circuitry to generate a digital signature based on tokens that correspond to information associated with the client computing system 105. The issuer computing system 115 can include instructions or computational circuitry to encrypt digitally-signed tokens that correspond to information associated with the client computing system 105. The issuer computing system 115 may generate a composite token based on the one or more encryption key components 125 and the digital signature generated by the token signer component 120. The issuer computing system 115 may generate the composite token by concatenating each of the encrypted digitally-signed tokens together into a single data structure. The issuer computing system 115 can provide the generated composite token to the client computing system 105 via the network 110. The issuer computing system 115 can receive, ask for, accept, or otherwise query for both the token signer component 125 and/or the encryption key component 125 from key manager 130 over the key distribution infrastructure 135. In some implementations, the key manager 130 may automatically send the token signer component 120 and/or the one or more encryption key component 125 to the issuer computing system 115 over the key distribution infrastructure 135.

The verifier computing systems 140 can include servers or other computing devices operated by a content provider entity to provide verification of the authenticity of signed tokens received from the client computing system 105 through the content item network 155. In some implementations, the signed tokens received from the content item network 155 may be a composite token. The verifier computing systems 140 may include a token verifier component 145 and a decryption key component 150. The verifier computing systems 140 may provide third-party content items or creatives (e.g., ads) for display on information resources, such as a website or web page that includes primary content over the content item network 155. The verifier computing systems 140 may only provide content items responsive to verifying the token associated with the client 105 using the decryption key component 150 and the token verifier component 145. One or more verifier computing systems 140 can receive a composite token corresponding to a client computing system 105 over the content item network 155. The composite token received from the content item network 155 may include one or more of encrypted digital signatures, one of which may correspond to one of the verifier computer systems 140. Each of the verifier computing systems 140 that received a composite token can parse the composite token to enumerate the plurality of encrypted digitally-signed tokens. Each of the verifier computing systems 140 may use the decryption key component 150 to decode the encrypted digitally-signed token that corresponds to the verifier computing system 140. The encrypted digitally-signed token may be determined to correspond with the verifier computing system 140 if the decoded digital signature in the encrypted digitally signed token can be verified using the token verifier component 145. The token verifier component 150 can use a public key corresponding to the private key maintained by the issuer computing system 115 to verify the decoded digital signatures. In some embodiments, the verifier computing system 140 can receive, ask for, accept, or otherwise query for both the token verifier and the one or more decryption keys from key manager computing system 130 over the key distribution infrastructure 135. In some implementations, the key manager computing system 130 may automatically send the token verifier component 145 and/or the decryption key component 150 to the verifier computing system 140 over the key distribution infrastructure 135.

The client computing system 105, the issuer computing system 115, the verifier computing systems 140, and the key manager computing system 130 can include a processor and a memory, i.e., a processing circuit. The memory stores machine instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language.

The client computing system 105, the issuer computing system 115, the verifier computing systems 140, and the key manager computing system 130 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices can be internal to a housing of the client computing system 105, the issuer computing system 115, the verifier computing systems 140, and the key manager system 130 (e.g., a built-in display, microphone, etc.) or external to the housing of the client computing system 105, the issuer computing system 115, the verifier computing system 140, and the key manager computing system 130 (e.g., a monitor connected to the client computing system 105, a speaker connected to the client computing system 105, etc.), according to various implementations. For example, the client computing system 105, the issuer computing system 115, the verifier computing systems 140, and the key manager computing system 130 can include an electronic display, which visually displays web pages using webpage data received from one or more content sources via the network 110, the content item network 155, or the key distribution infrastructure 135.

The issuer computing system 115 can include at least one server. For instance, the issuer computing system 115 can include a plurality of servers located in at least one data center or server farm. In some implementations, the issuer computing system 115 can include information about the client computer system 105. The issuer computing system 115 can include at least one token signer component 120, and at least one encryption key component 125. The token signer component 120 and encryption key component 125 each can include at least one processing unit, server, virtual server, circuit, engine, agent, appliance, or other logic device such as programmable logic arrays configured to communicate with other computing devices (e.g., the client computing system 105, or the key manager computing system 130) via the network 110 and/or the key distribution infrastructure 135.

The token signer component 120 and the encryption key component 125 can include or execute at least one computer program or at least one script. The token signer component 120 and the encryption key component 125 can be separate components, a single component, or part of the issuer computing system 115. The token signer component 120 and the encryption key component 125 can include combinations of software and hardware, such as one or more processors configured to execute one or more scripts.

The token signer component 120 can receive a first-party token from the client computing system 105 via the network 110. In some embodiments, the first-party token may be associated with the domain of the issuer computing system 115. In some embodiments, the first-party token may be generated by a browser that is executed on the client computing system 105. In some other embodiments, the first-party token may be a device token generated by the client computing system 105. In some embodiments, the token signer component 120 can receive a request from the client computing system 105 via network 110 to generate a first-party token. The request for a first-party token can include browser information corresponding to a browser executing on client computing system 105. The request for a first-party token can include device information corresponding to the client computing system 105. In some embodiments, the token signer component 120 can generate a first-party token responsive to the request from the client computing system 105. The first-party token can correspond to the domain of the issuer computing system 115. The token signer component 120 may receive a request for a composite token from the client computing system 105 via the network 110. In some embodiments, the token signer component 120 may receive a request for a digitally-signed token from the client computing system 105 via the network 110. The token signer component 120 can generate a time stamp corresponding to the receipt of the first-party token from the client computing system 105. The time stamp may be generated based on the current time maintained by the issuer computing system 115. The token signer component 120 can maintain one or more private keys corresponding to the issuer computing system 115. In some embodiments, the one or more private keys are received from the key manager computing system 130 via the key distribution infrastructure 135. The token signer component 120 can generate a digitally-signed first-party token using the one or more private keys. The token signer component 120 can provide the digitally-signed first-party token to the encryption key component 125 to generate one or more encrypted digitally-signed tokens. The token signer component 120 can provide the digitally-signed first-party token to the encryption key component 125 to generate a composite token comprising one or more encrypted digitally-signed tokens.

The encryption key component 125 can receive a digitally-signed first-party token from the token signer component 120. In some embodiments, the encryption key component 125 can receive a request for a composite token from the client computing system 105 via the network 110. In some embodiments, the encryption key component 125 can receive a request for an encrypted digitally-signed token from the client computing system 105 via the network 110. The encryption key component 125 can maintain one or more encryption keys. In some embodiments, each of the one or more encryption keys are public keys corresponding to a verifier computing system 140. In such embodiments, the verifier computing system 140 can maintain the private key associated with the corresponding public key maintained by the issuer computing system 115. The one or more encryption keys can be received from the key manager computing system 130 via the key distribution infrastructure 135. In some embodiments, encryption key component 125 can receive a request from token signer component 120 to generate one or more encrypted digitally-signed first-party tokens. In such embodiments, the encryption key component 125 may generate an encrypted digitally-signed token for each of the one or more encryption keys maintained by the encryption key component 125. The encryption key component 125 may generate a composite token comprising the one or more encrypted digitally-signed tokens. In such embodiments, the encryption key component 125 can generate the composite token by concatenating each of the one or more encrypted digitally signed tokens into a single data structure. The encryption key component can provide the composite token to the client computing system 105. In some embodiments, the encryption key component can provide the one or more encrypted digitally signed tokens to the client computing system 105.

The verifier computing system 140 can include at least one server. For instance, the verifier computing system 140 can include a plurality of servers located in at least one data center or server farm. In some implementations, the verifier computing system 140 can include information about the client computer system 105. The verifier computing system 140 can include at least one token verifier component 145, and at least one decryption key component 150. The token verifier component 145 and decryption key component 150 each can include at least one processing unit, server, virtual server, circuit, engine, agent, appliance, or other logic device such as programmable logic arrays configured to communicate with other computing devices (e.g., the client computing system 105, or the key manager computing system 130) via the content item network 155 and/or the key distribution infrastructure 135.

The token verifier component 145 and the decryption key component 150 can include or execute at least one computer program or at least one script. The token verifier component 145 and the decryption key component 150 can be separate components, a single component, or part of the verifier computing system 140. The token verifier component 145 and the decryption key component 150 can include combinations of software and hardware, such as one or more processors configured to execute one or more scripts.

The decryption key component 150 can receive a composite token corresponding to the client computing system 105 via the content item network 155. The composite token can include one or more encrypted digitally signed tokens. In some embodiments, the composite token may include a first-party token and a time stamp, the first-party token being used to generate the encrypted digitally-signed portions of the composite token. In such embodiments, the decryption key component 150 can check if the received time stamp of the composite token is recent to determine if the composite token was sent as part of a replay attack. If the composite token is determined to be part of a replay attack, the decryption key component can ignore the composite token, ceasing further processing of the composite token by the verifier computing system 140. The decryption key component 150 can receive a request from the content item network 155 to verify the authenticity of the composite token. The decryption key component 150 can receive a request from the content item network 155 to verify the one or more encrypted digitally signed tokens. The decryption key component 150 can maintain a decryption key. In some embodiments, the decryption key is a private key corresponding to the verifier computing system 140. In such embodiments, the issuer computing system 115 maintains the public key associated with the corresponding private key maintained by the verifier computing system 140.

The decryption key can be received from the key manager computing system 130 via the key distribution infrastructure 135. The decryption key component 150 can enumerate each of the encrypted digitally-signed tokens in the composite token received from the content item network 155. The decryption key component 150 can enumerate each of the encrypted digitally signed tokens received from the content item network 155. The decryption key component 150 can attempt to decode each of the enumerated encrypted digitally-signed tokens using the private key maintained by the decryption key component 150 to generate a digitally-signed token corresponding to the respective encrypted digitally-signed token. In some embodiments, the decryption key component 150 may determine which of the enumerated digitally-signed tokens corresponds to the verifier computing system 140. In such embodiments, the decryption key component 150 can decode the encrypted digitally-signed token that corresponds to the verifier computing system 140 using the private key to generate a digitally-signed token. The decryption key component 150 can provide the one or more generated digitally-signed tokens to the token verifier component 145.

The token verifier component 145 can receive one or more digitally-signed tokens provided by the decryption key component 150. The token verifier component can receive a first-party token and a timestamp. The token verifier component 145 can maintain a public key that corresponds to the private key maintained by the issuer computing system 115. In some embodiments, the token verifier component can receive the public key from the key manager computing system 130 via the key distribution infrastructure 135. The token verifier component 145 can verify the first-party token by verifying at least one of the digitally-signed tokens using the public key. For example, the token verifier component 145 can use the public key to decrypt each of the digitally-signed tokens received from the decryption key component 150 to generate one or more decoded token and time stamp pairs, each of the decoded token and time stamp pairs corresponding to a respective digitally-signed token. The token verifier component 145 can then compare each of the token and time stamp pairs to the first-party token and time stamp received by the verifier computing system 140 as a part of the composite token. If any of the token and time stamp pairs match the first-party token and time stamp received as a part of the composite token, the first-party token is considered verified. The composite token may contain more than one encrypted digitally signed token because each of the encrypted digitally signed tokens corresponds to a verifier computing system 140 that is authorized by the issuer computing system 115 to verify the authenticity of the first-party token. The digitally-signed tokens can be used as a digital-signature to verify the authenticity of the first-party token and time stamp. In some embodiments, the verifier computing system 140 can process the first-party token responsive to verifying the first-party token's authenticity.

Figure 2:
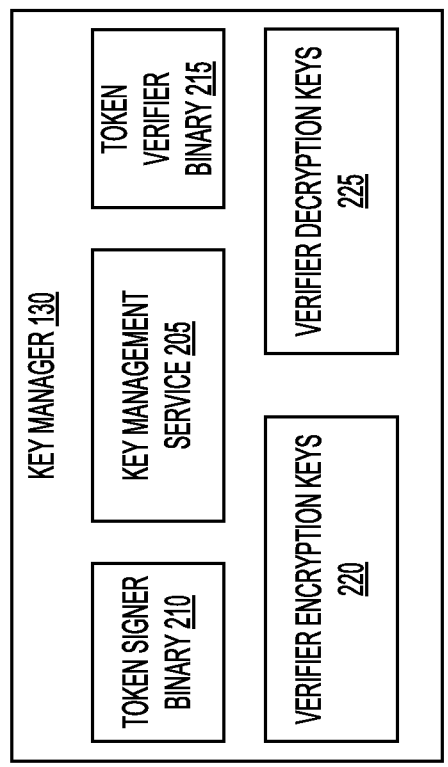
FIG. 2 shows a block diagram depicting an example implementation of a key manager 130, according to an illustrative implementation.

FIG. 2 shows a block diagram depicting an example implementation of a key manager computing system 130. The key manager computing system 130 can include a key management service 205, a token signer binary 210, a token verifier binary 215, verifier encryption keys 220, and verifier decryption keys 225. In some implementations, the key management service 205 can be executed by an operating system of the key manager computing system 130.

In some implementations, the key management service 205 can be an application programming interface provided by the operating system which the issuer computing system 115 and the verifier computing systems 140 can interface with to request token signer data and token verifier data. In some implementations, the issuer computing system 115 may authorize a decryption key to each verifier computing system 140 by interfacing with the key management service 205. In some implementations, the key management service may provide the token signer component 120 private key to the issuer computing system 115 using the token signer binary 210. In such implementations, the private key may be provided to the issuer computing system 115 via the key distribution infrastructure 135. In some implementations, the key management service may provide the token verifier component 145 public key to the verifier computing system 140 using the token verifier binary 215. In such implementations, the private key may be provided to the issuer computing system 115 via the key distribution infrastructure 135. The key management service 205 can authorize certain verifier computing systems 140 by generating specific verifier encryption keys 220 and verifier decryption keys 225. For example, the key management service 205 can receive a request to authorize only certain verifier computing systems 140 from the issuer computing system 115. The key management service 205 can then generate verifier encryption keys (e.g., public keys) and verifier decryption keys (e.g., private keys), each of the public/private key pairs corresponding to the verifier computing systems 140 authorized by issuer computing system 115. The key management service 205 can provide all of the public (encryption) keys to the encryption key component 125 of the issuer computing system 115 via the key distribution infrastructure 135. The key management service 205 can distribute each of the private (decryption) keys to the respective authorize verifier computing systems 140.

Figure 3:
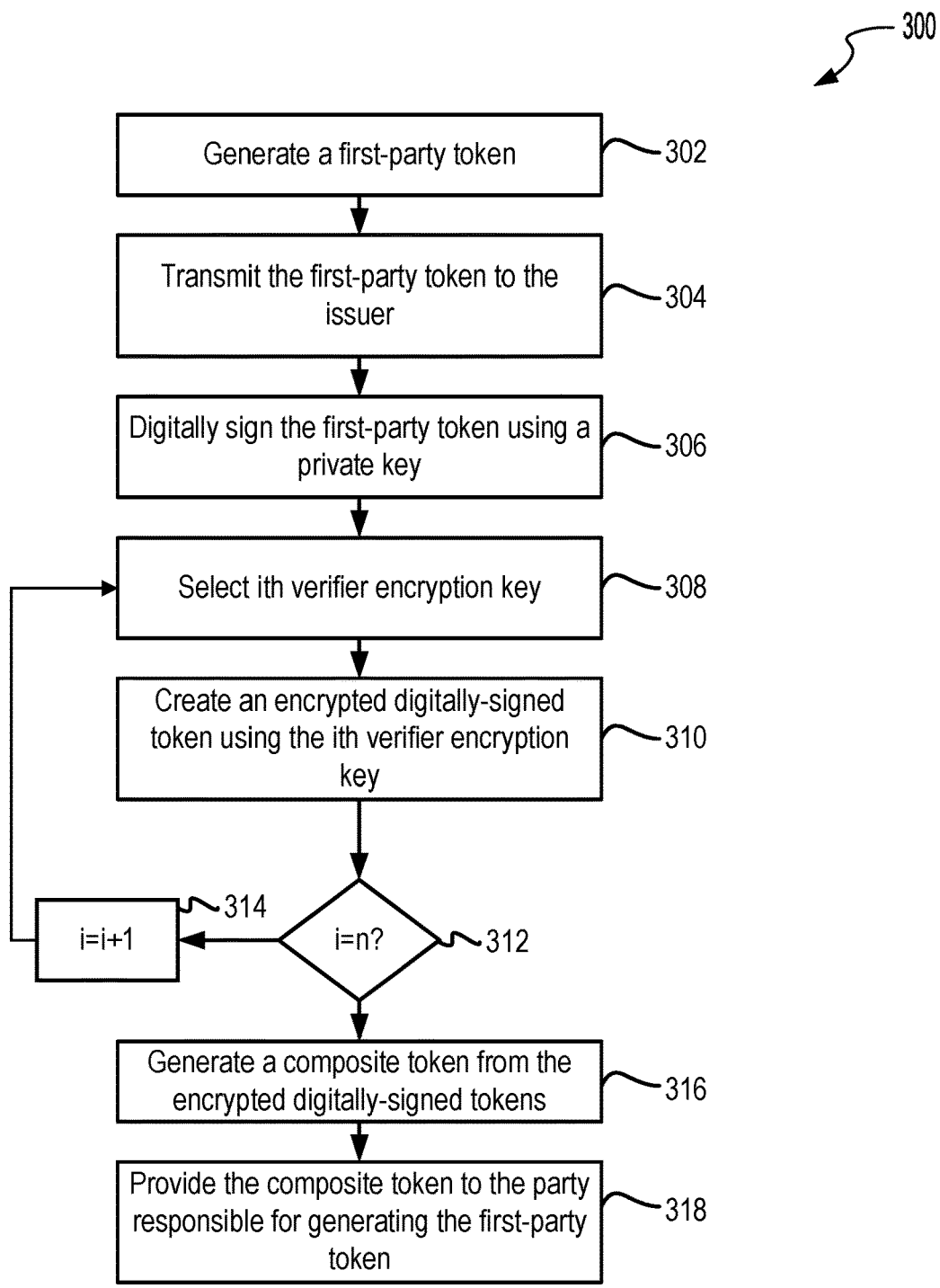
FIG. 3 shows a flow diagram of an example process for the generation of a composite token, according to an illustrative implementation.

FIG. 3 shows a flow diagram of an example process 300 for the generation of an encrypted composite token. The process 300 includes generating a first-party token 302, transmitting the first party token to the issuer 304, digitally signing the first-party token using a private key 306, selecting the ith verifier encryption key 308, creating an encrypted digitally-signed token using the ith verifier encryption key 310, determining if i is equal to the number of verifier encryption keys 312, incrementing the register i 314, generating a composite token from the encrypted digitally-signed tokens 316, and providing the composite token to the party responsible for generating the first-party token 318.

In further detail of step 302, a party generates a first-party token. In some implementations, the first-party token may be associated with the domain of an issuer. In some implementations, the first-party token may include data from an application (e.g., a web browser). In some implementations, generating the first-party token includes device information from the device or system executing process 300. Generating the first-party token may include generating a request for an encrypted digitally-signed token from an issuing party. The issuing party may also be called the issuer. Generating the first-party token may include generating a request for a composite token from the issuer. In some implementations, generating the first-party token may include generating a time stamp. In such implementations, the time stamp may be a time stamp with high resolution (e.g., millisecond or microsecond resolution, etc.).

In further detail of step 304, a party transmits the first-party token to the issuer. Transmitting the first-party token to the issuer could include transmitting a time stamp generated by the party. In some embodiments, transmitting the first-party token can include transmitting a request for an encrypted digitally-signed token to the issuer. In some embodiments, transmitting the first-party token can include transmitting a request for a composite token to the issuer, the composite token comprising at least one or more encrypted digitally-signed tokens. Transmitting the first-party token could include transmitting a request for a digitally-signed token from the issuer.

In further detail of step 306, the issuer digitally signs the first-party token transmitted in step 304 using a private key. In some embodiments, step 306 can include receiving, by the issuer, the digitally-signed token generated by the party in step 302. In some embodiments, receiving, by the issuer, the digitally-signed token can include receiving a timestamp generated in step 302 or step 304. In some embodiments, step 306 of the process can concatenate the first-party token and the time stamp into a token-timestamp pair. In step 306, the issuer can sign digitally sign the first-party token using a digital signature algorithm (e.g., DSA, RSA, etc.). In some embodiments, the issuer can generate a digitally-signed token by using a digital signature algorithm on the token-timestamp pair. In some embodiments, a hash function (e.g., SHA-1, SHA-256, MD5, etc.) can performed using the first-party token as input to generate a hashed token. In some embodiments, a hash function can be performed using the token-timestamp pair as an input to generate a hashed token-timestamp pair. The issuer of process 300 can generate a digitally signed token using a digital signature algorithm on the hashed token. In some embodiments, the issuer of process 300 can generate a signed token using a digital signature algorithm on the hashed token-timestamp pair.

The process 300 includes selecting the ith verifier encryption key 308. This process stage can be executed, for example, by the issuer computing system 115 to encrypt the digitally-signed token for all encryption keys maintained by the encryption key component 125. In some embodiments, step 308 can include receiving one or more encryption keys that each correspond to a verifying party, where n is equal to the number of encryption keys. In some embodiments, the encryption keys may be received from a key manager, for example the key manager computing system 130. In some embodiments, the encryption keys are public keys that correspond to a respective verifying party. In the first iteration of the loop created by process 300, step 308 can select the first encryption key (ith, i=1). It should be understood that the one or more encryption keys can be selected in any order.

In further detail of step 310, the process 300 can create an encrypted digitally-signed token using the ith verifier encryption key. In some embodiments, the process 300 uses an asymmetric encryption algorithm, where the encryption key is the public key and the private key belongs to a verifying party. The process 300 can create the encrypted digitally-signed token by encrypting the digitally signed token generated in step 306 with the ith encryption key selected in step 308. In some embodiments, the encryption key may be a private key of a public/private key pair, where the public key is maintained by a verifying party. In some embodiments, step 310 does not encrypt the digitally-signed token generated in step 306, and simply returns the digitally-signed token.

The process 300 includes creating the encrypted digitally-signed tokens corresponding to all of the encryption keys maintained by the issuer. For example, encryption key component 125 of the issuer computing system 115 can determine whether the currently created encrypted digitally-signed token is the nth encrypted digitally-signed token, where n corresponds to the number of encryption keys maintained by the encryption key component 125. If no, then the encryption key component 125 can increment the counter i 312, and select the next encryption key from the encryption keys maintained by the encryption key component 125. In this manner, the issuer computing system 115 can create n encrypted digitally-signed tokens, where each of the n encrypted digitally-signed tokens corresponds to a verifying party, for example the verifier computing systems 140.

Figure 5:
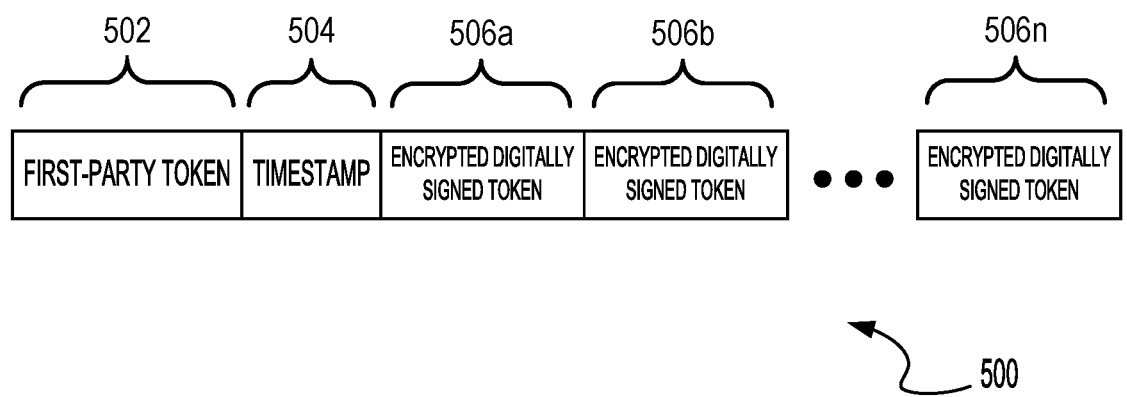
FIG. 5 shows a representation of a composite token generated by the process shown in FIG. 2.

In further detail of step 316, the process 300 can generate a composite token from the encrypted digitally-signed tokens. The composite token can be generated by concatenating each of the encrypted digitally signed tokens into a single data structure. An example of this concatenation is illustrated in FIG. 5. In this illustrative embodiment, 506a-n represent each of the encrypted digitally-signed tokens created in step 310, where each of the n digitally-signed tokens corresponds to a verifying party, for example one of the verifier computing systems 140. In some embodiments, the composite token can be generated by concatenating each of the encrypted digitally-signed tokens and the original first-party token and time stamp into a single data structure. An embodiment of the result of this concatenation is illustrated in FIG. 5, where 502 is the original first-party token, 504 is the time stamp that corresponds to the original first-party token, and 506a-n are each of the n encrypted digitally-signed tokens. Although FIG. 5 illustrates the first-party token, time stamp, and encrypted digitally-signed tokens in a specific order, it should be understood that any of components may be excluded from the composite token, and any of these elements may appear in the composite token in any order.

In further detail of step 318, process 300 provides the composite token to the party responsible for generating the first party token. The process 300 can provide the composite token generated in step 316 to the party who generated the first-party token in step 302. For example, the issuer computing system 115 can transmit the composite token generated by the encryption key component 125 to the client computing system 105 via the network 110. In some embodiments, the issuer can provide the composite token to the party responsible for generating the first-party token through a web interface. For example, the issuer computing system 115 can transmit the generated composite token via a web interface, and the client computing system 105 can receive the composite token as a part of a browser session.

Figure 4:
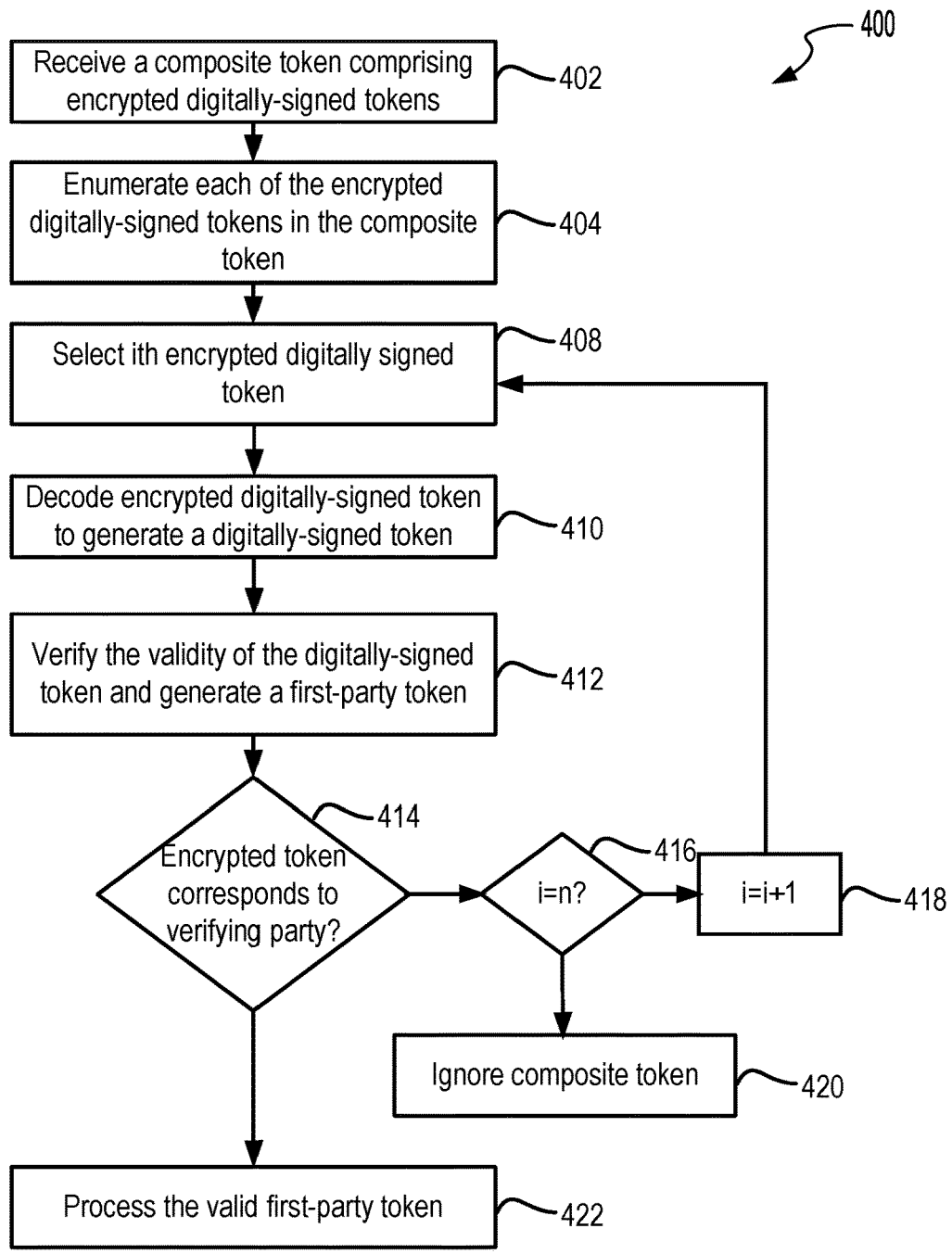
FIG. 4 shows a flow diagram of an example process for the verification of the contents of a composite token, according to an illustrative implementation.

FIG. 4 shows a flow diagram of an example process 400 for the verification of the contents of a composite token. The process 400 includes receiving a composite token 402, enumerating each of the encrypted digitally-signed tokens in the composite token 404, selecting the ith encrypted digitally-signed token 408, decoding the encrypted digitally-signed token to generate a digitally-signed token 410, verifying the validity of the digitally-signed token and generating a first-party token 412, determining whether the encrypted token corresponds to the verifying party 414, determining if i is equal to the number of encrypted digitally-signed tokens in the composite token n 416, incrementing the register i 418, ignoring the composite token 420, and processing the valid first-party token 422.

In further detail of step 402, the process 400 can receive a composite token comprising one or more encrypted digitally-signed tokens. For example, one of the verifying computing systems 140 can receive a composite token from the content item network 155. The composite token can include one or more encrypted digitally-signed tokens. The composite token can also include a first-party token and a time stamp. An example schematic of a composite token is illustrated in FIG. 5. The process 400 can be executed by a party that needs to verify the authenticity of a first-party token. In some embodiments, the composite token may be received as a single data structure. In some other embodiments, the composite token may be received as a series of data structures. For example, the verifying party executing the process 400 may receive the encrypted digitally-signed tokens one at a time, and use them to create a composite token. In some embodiments, the first-party token may include a time stamp that corresponds to the creation of the first-party token. In such embodiments, the first-party token and time stamp can be included in the composite token.

In further detail of step 404, the process 400 enumerates each of the encrypted digitally-signed tokens in the composite token received in step 402. In some embodiments, enumerating each of the encrypted digitally-signed tokens includes extracting each encrypted digitally-signed token. In such embodiments, a first-party token and time stamp may also be extracted from the composite token. In such embodiments, the verifying party executing process 400 can compare the time stamp in the composite token to a predetermined value. The verifying party executing process 400 can compare the time stamp to check if the composite token is recent, and defend against potential replay attacks. In some embodiments, the composite token may be a predetermined data structure known to the verifying party executing the process 400. In such embodiments, the verifying party may extract and enumerate each of the encrypted digitally-signed tokens by based off of the known offsets in the data structure. In some embodiments, enumerating each of the encrypted digitally-signed tokens may include assigning a numerical value to that corresponds to each of the encrypted digitally-signed tokens. For example, referring to FIG. 5, each of the encrypted digitally-signed tokens 506a-n could be assigned a numerical value corresponding to its order in the composite token. Furthering this example, 506a could be assigned the value of 1, 506b could be assigned the value of 2, 506c could be assigned the value of 3, and so on. In some embodiments, the verifying party executing step 404 can determine the number of encrypted digitally-signed tokens n included in the composite token received in step 402.

The process 400 includes selecting the ith encrypted digitally-signed token 408. This process stage can be executed, for example, by the verifier computing system 115 to decode each of the encrypted digitally-signed tokens comprising the composite token. In some embodiments, step 308 can include received a decryption key that corresponds to the verifying party executing process 400. In some embodiments, the decryption key may be received from a key manager, for example the key manager computing system 130. In some embodiments, the decryption key is a private key that corresponds to the verifying party executing process 400. In such embodiments, the corresponding public key is maintained by the issuer responsible for generating the composite token. In the first iteration of the loop created by process 400, step 408 can select the first encrypted digitally-signed token (ith, i=1). It should be understood that the one or more encryption keys can be selected in any order.

In further detail of step 410, process 400 decodes the selected encrypted digitally-signed token to generate a digitally-signed token. The verifying party can decode encrypted digitally-signed token selected in step 408 and generate a digitally-signed token. For example, one of the verifier computing systems 140 could execute step 410 of the process 400 using the decryption key component 150. To further the example, the decryption key component 150 of the verifier computing system 140 executing process 400 could receive the decryption key from the key manager computing system 130 via the key distribution infrastructure 135. In some embodiments, step 410 of the process 400 could include receiving a decryption key from a key manager. In some other embodiments, the decryption key could be maintained or received by the verifying party executing process 400 prior to the execution of process 400. In some embodiments, decoding the encrypted digitally-signed token is performed using a decryption algorithm (e.g., elliptic curve, RSA, etc.).

In further detail of step 412, the digitally-signed token is verified to generate a first-party token. In some embodiments, the digitally-signed token is verified to generate a hash of a first-party token. The verifying party executing the process 400 can use a digital signature algorithm (e.g., elliptic curve, DSA, RSA, etc.) to decrypt the contents of the digitally-signed token generated in step 410, the decrypted contents of the digitally-signed token being a first-party token and time stamp which can be used to verify the validity of the first-party token received in the composite token in step 402 of process 400. In some embodiments, the decrypted contents of the digitally-signed token is a hash of a first-party token and time stamp. In some embodiments, the digital signature algorithm uses the public key of the issuer to decrypt the contents of the digitally-signed token. For example, the key manager computing system 130 may distribute a private key to the issuer computing system 115 and the corresponding public key to the verifier computing systems 140. The issuer computing system 115 can use process 300 to generate a composite key, which is provided to the client computing system 105. The client computing system 105 can provide the composite token to the content item network 155, which can provide the composite token to one or more verifier computing systems 140. The verifier computing systems can use process 400 to attempt to process the first-party token contained in the composite token. In this example, the verifier computing system 140 can use the public key corresponding to the private key maintained by the issuer computing system 115 to decrypt the digitally-signed token in step 412 to generate a first-party token and time stamp, or in some embodiments a hash of a first-party token and time stamp.

In further detail of step 414, the process 400 determines if the decrypted contents of the digitally signed token correspond to the verifying party executing process 400. For example, the composite token can contain more than one encrypted digitally-signed token. Each encrypted digitally-signed token can only be decrypted by an authorized verifying party. In this example, authorization is controlled by the distribution of decryption keys. Each decryption key can only successfully decrypt the contents of up to one of the encrypted digitally-signed tokens contained in the composite token. The verifying party can determine if the encrypted digitally-signed token corresponds to the verifying party executing process 400 by checking to see if the digital signature (i.e., the digitally-signed token generated in step 410) matches the first-party token and timestamp included in the composite token received in step 402. The verifying party can check if first-party token and time stamp generated in step 412 match the first-party token and time stamp received as a part of the composite token. In some embodiments, the step 412 may return a hash of the first-party token and timestamp. In such embodiments, step 414 computes a hash of the first-party token and time stamp received as a part of the composite token using a cryptographic hash function (e.g., SHA-1, SHA-256, MD5, etc.), and compares it to the value returned from the decryption of the digitally-signed token in step 412. If the two values match, then the encrypted digitally-signed token corresponds to the verifying party, and the first-party token can be processed by the verifying party in step 422. If no, then the verifying party executing the process 400 can determine if the current encrypted digitally-signed token is the nth encrypted digitally-signed token 416. If no, then the verifying party executing process 400 can increment the counter i 418 and select the next encrypted digitally-signed token 408. If the current encrypted digitally-signed token is the nth encrypted digitally-signed token, then none of the encrypted digitally-signed tokens in the composite token correspond to the verifying party executing process 400, and the composite token is ignored 420.

In further detail of step 422, the verifying party executing process 400 can process the verified first-party token. In some embodiments, the verification process 400 can be performed in real-time without accessing outside servers or databases. In some embodiments, the processing of the first-party token includes consuming the data contents of the token. For example, the token may contain browser information. By verifying the authenticity of the first-party token, the verifying party can now associate the browser information contained in the first-party token with the party responsible for generating the first-party token, for example client computing system 105. The verification process 400 allows verifying parties which may require very low-latency token authentication a method to verify the authenticity of the first-party token in under a predetermined amount of time, for example 100 milliseconds.

Figure 6:
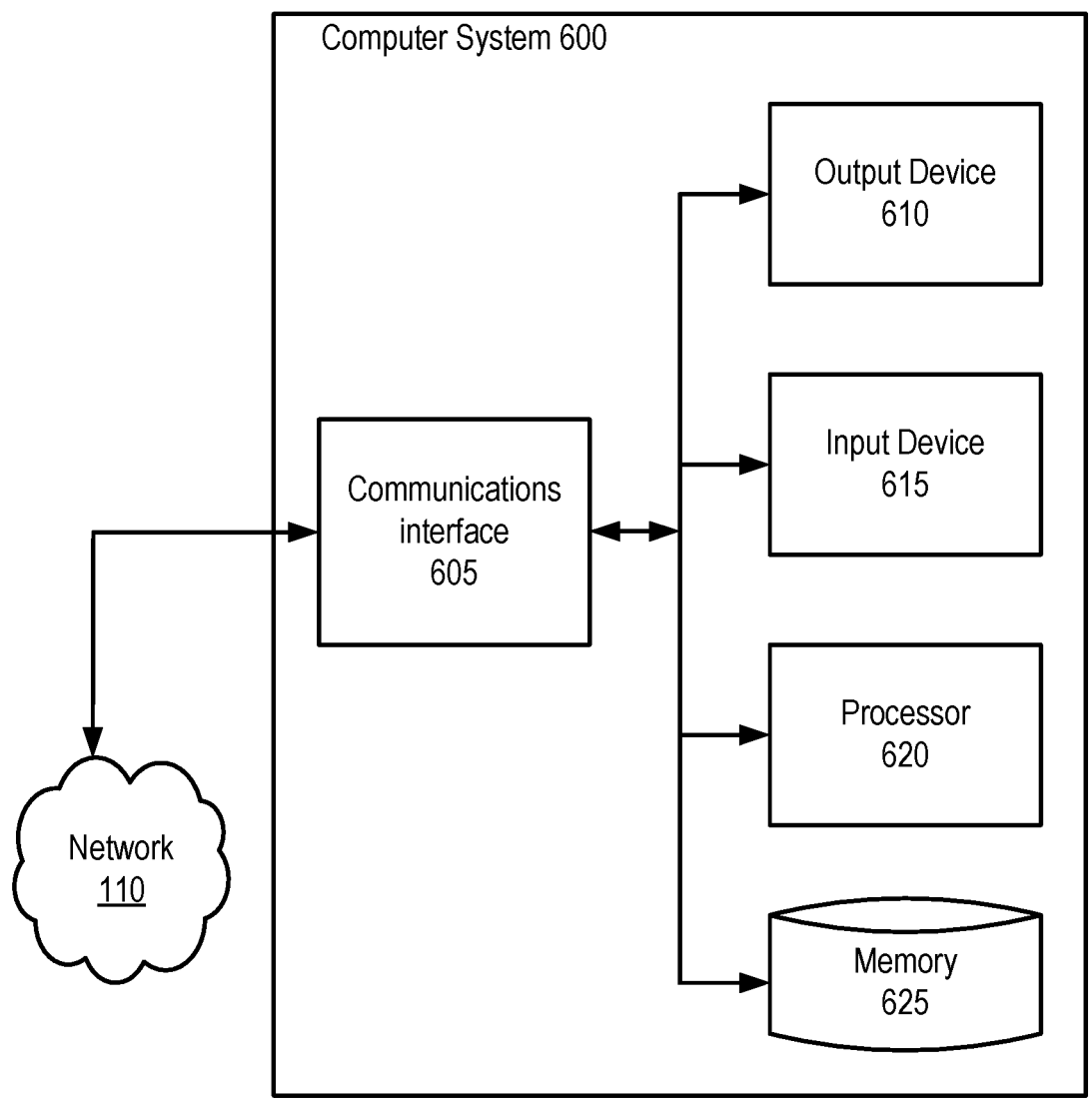
FIG. 6 shows the general architecture of an illustrative computer system that may be employed to implement any of the computer systems discussed herein.

FIG. 6 shows the general architecture of an illustrative computer system 600 that may be employed to implement any of the computer systems discussed herein (including the client computing system 105, the issuer computing system 115 and its components such as the token signer component 120 and the encryption key component 125, the verifier computing systems 140 and its components such as the token verifier component 145 and the decryption key component 150, and the key manager computing system and its components) in accordance with some implementations. The computer system 600 can be used to provide information via the network 110, the content item network 155, or the key distribution infrastructure 135 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the client computing system 115. The processors 620 can be included in the issuer computing system 115 or the other components of the issuer computing system 115 such as the token signer component 120 and the encryption key component 125. The processors 620 can be included in the verifier computing systems 140 or the other components of the verifier computing systems 140 such as the token verifier component 145 and the decryption key component 150. The processors 620 can be included in the key manager computing systems 130 or the other components of the key manager computing systems 130 such as the key management service 205.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring to the key manager computing system 130 of FIG. 2, the key manager computing system 130 can include the memory 625 to store information related to verifier encryption keys 220 and the verifier decryption keys 225, among others. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 6, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 805 include user interfaces (e.g., web pages), through which the user can communicate with the data processing system 600.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request component 130, the content selection component 135, and the attribution component 150 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing systems such as the issuer computing system 115, the verifier computing systems 140, the client computing systems 105, and the key manager computing system 130 can include clients and servers. For example, the issuer computing system 115, the verifier computing systems 140, the client computing systems 105, and the key manager computing system 130 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the token signer component 120 and the encryption key component 125 can be part of the issuer computing system 115, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A method for providing a signed identity token comprising:

receiving, by an issuer, a first-party token associated with a domain of the issuer and browser information associated with a party that generated the first-party token, and creating a time stamp to correspond to the first-party token;

encrypting, by the issuer, the first-party token and the time stamp using a private key of the issuer to create a digitally-signed token;

creating, by the issuer, a plurality of digitally-signed tokens, each of the plurality of digitally-signed tokens corresponding to a respective verifying party;

encrypting each of the plurality of digitally-signed tokens using a public key provided by the respective verifying party;

generating, by the issuer, a composite token comprising each of the plurality of encrypted digitally-signed tokens; and providing, by the issuer, the composite token to a party responsible for generating the first-party token.

2. The method of claim 1, wherein the first-party token is generated based on, in part, device information associated with the party that generated the first-party token.

3. The method of claim 1, wherein receiving, by the issuer, the first-party token associated with the domain of the issuer includes receiving device information associated with the party.

4. The method of claim 1, wherein the first-party token includes a high-resolution time stamp of at least 64-bits.

5. A method for verifying the identity of a user comprising:

receiving, by a verifying party, a composite token and a time stamp, wherein the composite token comprises a plurality of encrypted digitally-signed tokens and a second time stamp;

enumerating, by the verifying party, each of the plurality of encrypted digitally-signed tokens in the composite token;

determining, by the verifying party, which of the enumerated encrypted digitally signed tokens corresponds to the verifying party;

decoding, by the verifying party the encrypted signed token corresponding to the verifying party using a private key belonging to the verifying party to generate a signed token;

verifying, by the verifying party using a public key corresponding to an issuer, the validity of a digital signature of the signed token to generate a valid first-party token based on comparing the time stamp received with the composite token with a time stamp included in the digital signature of the signed token; and processing, by the verifying party, responsive to the digital signature of the signed token being valid, the valid first-party token generated from the signed token.

6. The method of claim 5, wherein receiving, by the verifying party, the composite token and the time stamp includes receiving a high-resolution time stamp of at least 64-bits.

7. The method of claim 5, wherein verifying, by the verifying party using the public key corresponding to the issuer, the validity of the digital signature of the signed token to generate the valid first-party token includes generating a valid first-party device token.

8. The method of claim 5, wherein verifying, by the verifying party using the public key corresponding to the issuer, the validity of the digital signature of the signed token to generate the valid first-party token includes generating a valid first-party browser token.

9. The method of claim 5, wherein determining, by the verifying party, which of the enumerated encrypted digitally signed tokens corresponds to the verifying party includes ignoring the composite token responsive to none of the enumerated encrypted digitally signed tokens corresponding to the verifying party.

10. The method of claim 5, wherein verifying the validity of the digital signature of the signed token includes comparing the signed token and the time stamp to an unencrypted token included in the composite token.

11. A system for providing an encrypted signed identity token responsive to a request, the system comprising one or more hardware processors configured to:

receive a first-party token associated with a domain of an issuer and browser information associated with a party that generated the first-party token, and create a time stamp;

encrypt the first-party token and the time stamp corresponding to the request using a private key of the issuer to create a digitally-signed token;

create a plurality of digitally-signed tokens, each of the plurality of digitally-signed tokens corresponding to a respective verifying party;

encrypt each of the plurality of digitally-signed tokens using a public key provided by the respective verifying party;

generate a composite token comprising each of the plurality of encrypted digitally-signed tokens; and provide the composite token to a party responsible for initiating the request for the first-party token.

12. The system of claim 11, wherein the first-party token and the time stamp associated with the domain of the issuer is generated based on, in part, device information associated with the party that generated the first-party token.

13. The system of claim 12, wherein the one or more hardware processors are further configured to receive the first-party token associated with the domain of the issuer and the time stamp, and the device information associated with the party.

14. The system of claim 11, wherein the time stamp generated with the first-party token is a high-resolution time stamp of at least 64-bits.

15. A system for verifying the identity of a user, the system comprising one or more hardware processors configured to:

receive a composite token and a time stamp, wherein the composite token comprises a plurality of encrypted digitally-signed tokens;

enumerate each of the plurality of encrypted digitally-signed tokens in the composite token;

determine which of the enumerated encrypted digitally signed tokens corresponds to the verifying party;

decode the encrypted signed token corresponding to the verifying party using a private key belonging to the verifying party to generate a signed token;

verify, using a public key corresponding to an issuer, the validity of a digital signature of the signed token to generate a valid first-party token based on comparing the time stamp received with the composite token to a time stamp included in the digital signature of the signed token; and process, responsive to the digital signature of the signed token being valid, the valid first-party token generated from the signed token.

\* \* \* \* \*